(12) United States Patent
Ozden et al.

(10) Patent No.: US 6,278,998 B1
(45) Date of Patent: Aug. 21, 2001

(54) DATA MINING USING CYCLIC ASSOCIATION RULES

(75) Inventors: Banu Ozden, Summit; Sridhar Ramaswamy, Scotch Plains; Abraham Silberschatz, Summit, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/250,502

(22) Filed: Feb. 16, 1999

(51) Int. Cl.$^7$ .................................................. G06F 17/30
(52) U.S. Cl. ............................ 707/6; 707/1; 707/3; 707/5
(58) Field of Search ........................................ 707/6, 1–10

(56) References Cited

U.S. PATENT DOCUMENTS

| | | | |
|---|---|---|---|
| 5,832,482 | * 11/1998 | Yu et al. ................................... | 707/6 |
| 5,943,667 | * 8/1999 | Aggarwal et al. ........................ | 707/3 |
| 5,946,683 | * 8/1999 | Rastogi et al. ............................ | 707/6 |
| 5,983,222 | * 11/1999 | Morimoto et al. ........................ | 707/6 |
| 6,023,571 | * 2/2000 | Matsumoto et al. ...................... | 703/2 |
| 6,061,682 | * 5/2000 | Aggarwal et al. ........................ | 707/6 |
| 6,092,064 | * 7/2000 | Aggarwal et al. ........................ | 707/6 |
| 6,094,645 | * 7/2000 | Aggarwal et al. ........................ | 706/47 |
| 6,134,555 | * 10/2000 | Chadha et al. ........................... | 707/102 |
| 6,151,601 | * 11/2000 | Papierniak et al. ...................... | 707/10 |
| 6,185,549 | * 2/2001 | Rastogi et al. ........................... | 706/45 |
| 6,189,005 | * 2/2001 | Chakrabarti et al. ..................... | 707/6 |

OTHER PUBLICATIONS

Ozden, B.; Ramaswamy, S.; Silberschatz, A.; Cyclic Association Rules, Feb. 1998, IEEE.*

* cited by examiner

*Primary Examiner*—John Breene
*Assistant Examiner*—Debbie M Le
(74) *Attorney, Agent, or Firm*—William Ryan

(57) ABSTRACT

A system and method for discovering association rules that display regular cyclic variation over time is disclosed. Such association rules may apply over daily, weekly or monthly (or other) cycles of sales data or the like. A first technique, referred to as the sequential algorithm, treats association rules and cycles relatively independently. Based on the interaction between association rules and time, we employ a new technique called cycle pruning, which reduces the amount of time needed to find cyclic association rules. A second algorithm, the interleaved algorithm, uses cycle pruning and other optimization techniques for discovering cyclic association rules with reduced overhead.

22 Claims, 4 Drawing Sheets

DATA MINING USING CYCLIC ASSOCIATION RULES

FIELD OF THE INVENTION

The present invention relates generally to the field of database methods and systems. More particularly, the present invention relates, in one aspect, to methods and systems for analyzing and mining information stored in database systems. Still more particularly, aspects of the present invention relate to identifying and extracting information exhibiting inter-relationships and temporal cycles.

BACKGROUND OF THE INVENTION

Recent advances in data collection and storage technology have made it possible for many companies to keep large amounts of data relating to their business online. At the same time, low cost computing power has also made enhanced automatic analysis of these data feasible. This activity is commonly referred to as data mining.

One major application domain of data mining is in the analysis of transactional data. In this application database system records include information about user transactions, where each transaction is a collection of items. In this setting, association rules capture inter-relationships between various items. An association rule captures the notion of a set of items occurring together in transactions. For example, in a database maintained by a supermarket, an association rule might be of the form "beer→chips (3%, 87%)," which means that 3% of all database transactions contain the items beer and chips, and 87% of the transactions that have the item "beer" also have the item "chips" in them. The two percentage parameters above are commonly referred to as "support" and "confidence," respectively. Typically, the data mining process is controlled by a user who sets minimum thresholds for the support and confidence parameters. The user might also impose other restrictions, such as restricting the search space of items, in order to guide the data mining process.

Following the early work in Agrawal, R., T. Imielinski and A. Swami "Mining Association Rules between Sets of Items in Large Databases," *Proc.* 1993 *ACM SIGMOD Intl. Conf. on Management of Data*, pp. 207–216, Wash., D.C., May 1993, association rules have been extensively studied. (The last-cited paper will be referred to in the sequel as "Agrawal, et al 93.") However, this work treats data as one large segment, with no attention paid to segmenting data over different time intervals. For example, returning to our previous example, it may be the case that beer and chips are sold together primarily between 6 PM and, 9 PM. Therefore, if we segment the data over the intervals 7 AM–6 PM and 6 PM–9 PM, we may find that the support for the beer and chips rule jumps to 50%.

Prior data mining systems and methods have failed to provide for identifying, analyzing and reporting time-dependent associated data in an efficient, readily usable manner.

SUMMARY OF THE INVENTION

Limitations of the prior art are overcome and a technical advance is made in accordance with the present invention described in illustrative embodiments herein.

In one aspect, the present invention provides systems and methods for discovering regularities in the behavior of association rules over time. These techniques enable marketers and others to better identify trends in sales and other contexts, and to allow better forecasting of future events, such as user demand for products, services or other resources.

Typically, transactional data to be analyzed are time-stamped and user-divided into disjoint segments corresponding to respective time intervals. In a common arrangement, users opt for "natural" segmentation of data based on months, weeks, days, etc. In any event, users are usually best qualified to make this decision based on their understanding of the underlying data.

In accordance with another aspect of the present invention, we refer to an association rule as cyclic if the rule has the minimum confidence and support at regular time intervals. Such a rule need not hold for the entire transactional database, but rather only for transactional data in a particular periodic time interval. That is, each cyclic rule must have the user specified minimum support and confidence over a specific periodic time interval. The user typically specifies upper and lower bounds for the periods of such time intervals.

We consider mining cyclic association rules as generating all cycles of association rules. Given a large database comprising transactional information, where each transaction consists of a transaction-id, a set of items and a time-stamp, we provide efficient algorithms to discover such cyclic association rules.

In studying the interaction between cycles and association rule mining, we identify techniques for cycle pruning, cycle skipping and cycle elimination that allow us to significantly reduce the amount of wasted work typically expended during data mining processes.

While an extension of existing association rule mining techniques (treating association rules and cycles independently) can be pursued for some applications, preferred embodiments of the present invention generates cyclic association rules using a two-phase technique. In a first phase, cyclic large itemsets are discovered and advantageously reduced using cycle-pruning, cycle-skipping and cycle-elimination techniques. In a second phase cyclic rules are discovered by sequentially processing results from phase one for each user-specified time interval.

Further aspects of inventive embodiments and the effectiveness of described techniques are demonstrated in disclosed examples.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION
Overview of Typical Cyclic Data Mining Processes

Based on the examples of prior analyses of the type cited above, we observe that although an association rule may have the user specified minimum confidence and support within the entire time spectrum, analysis of the data in finer time granularity may reveal that the association rule exists only in certain time intervals, and does not occur in the remaining time intervals. In this section, we further illustrate cyclic data patterns in data mining rules and present a simple example of such cyclic patterns arising from transaction data records. While this and other examples may provide a context, such as supermarket sales records, it should be understood that such examples are merely typical, and in no way limit the applicability of the present invention and its many embodiments.

Observation of many association rules over monthly data may disclose seasonal variation where peaks occur at approximately the same month in each year. Association rules can also display regular hourly, daily, weekly, etc., variation that has the appearance of cycles. It is also possible that an association rule does not have the user specified minimum confidence and/or support over the entire time spectrum, but its confidence and support are above the minimum threshold within certain time intervals. We have found that these time intervals sometimes display a periodicity, and that discovering association rules and their periodicities may reveal interesting information that can be used for real world prediction and decision making.

Using another supermarket example to which the present inventive techniques may be applied, we analyze sales data over several months. More specifically, assume that we are interested in selling patterns for the items coffee and doughnuts. If we were to look at the overall support for coffee and doughnuts occurring together in transactions, we might discover that the two items do not have enough support (i.e., these items do not meet the minimum threshold for support specified by the user). However, if we look into hourly sales figures, we might discover that coffee and doughnuts have a strong tendency to occur together with high support during the time interval 7 AM–9 AM. That is, "coffee→doughnuts" during the interval 7 AM–9 AM every day. Further analysis might also reveal a larger weekly tendency, wherein coffee and doughnut sales dip during weekends.

Illustrative System Overview

Figure 1:
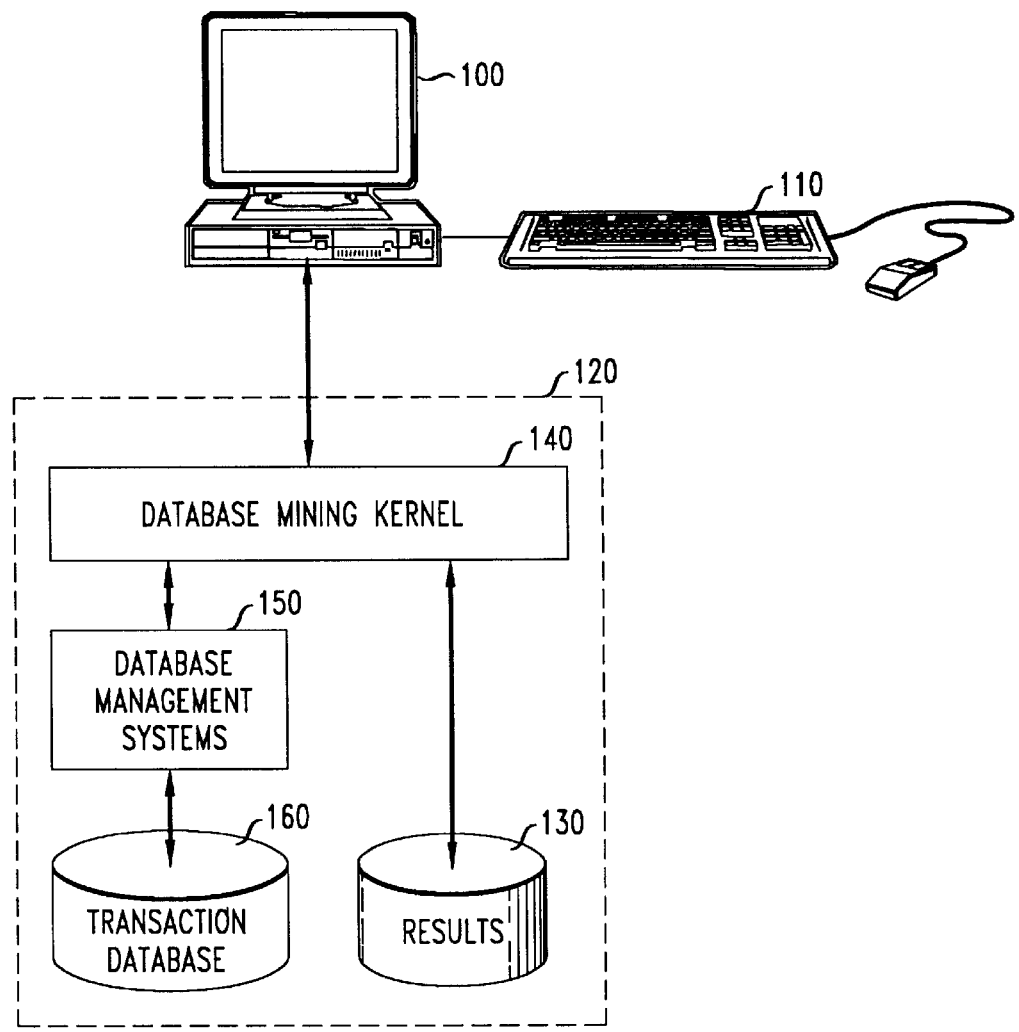
FIG. 1 is an overall view of an illustrative system for carrying out data mining operations in accordance with illustrative embodiments of the present invention.

The present inventive systems and methods can be embodied in a number of forms. While special purpose digital logic may be used to implement the current inventive techniques, it usually proves more convenient to use one or more programmed general purpose computers to realize the advantages of embodiments of the present invention. FIG. 1 shows one such illustrative embodiment of the present invention. There, a user workstation or personal computer 100 is shown connected to a server or database computer 120. Database computer (server) 120 comprises a database management system 150, which, in turn, comprises the operating system and commercially available database management system software, such as database manager software available from Oracle or IBM Corporation. Other particular database management software may, of course, be used, as may suit user requirements or preferences and particular characteristics of data records stored in transaction database 160. Data records in database 160 comprise the transaction or other records to be processed to determine the existence of any cyclic association rules.

In applying the processing to be described in more detail below in connection with particular embodiments of the present invention, it proves convenient to frame user requests and requirements using keyboard 110 or other input devices in terms recognizable to a software module such as database mining kernel 140 in FIG. 1. Kernel 140 may be any of a variety of software modules which provide, for example, a toolkit of algorithms and processing techniques that allow users to analyze data in database 160. Such kernels are available from IBM Corporation, Oracle and others and allow operations including deviation detection, classification and predictive modeling, association, sequential pattern discovery, and database segmentation. In application development, these kernels typically provide a graphical, icon-based environment for developers to use and combine transformers (executable objects) to perform required functions. One such kernel available from IBM Corp. runs on AIX, OS/400, and OS/390 platforms, and it supports clients on AIX, Windows, and OS/2. The functionality of kernel 140 may also be provided by appropriate specially developed queries and database management instructions provided by a user to the database management system.

The combination of server operating system, database management system (collectively database manangement system 150) and illustrative database mining kernel 140 are accessed by user terminal 100 through local wire or wireless connections, or over a local area network, or over a more extensive network—such as a campus network, wide area network or the Internet. User-defined selection and other criteria defined in a user-developed application are typically imposed through database mining kernel 140 and the database management system on the data records in transaction database 160. Records or analyses of record sets are thereby non-destructively read or extracted from transaction database, and these results are stored, at least temporarily, in illustrative results database or results file 130. As is known in the art, data structuring and storage can greatly influence operating speed. Accordingly, some applications of the present inventive techniques will seek to store intermediate and final results of processing in main memory of server 120 rather than in secondary storage such as disk or tape memory—when available system capacity makes this possible.

In appropriate cases, user applications can be developed and run at user terminal 100 for interaction with database mining kernel 140 on a server 120 such as that shown in FIG. 1. In other cases, such applications can be run entirely at the user location 100. That is, the kernel functionality, database manager and database can all be operative at the user location 100. In these latter cases, user terminal 100 will typically include workstation functionality and sufficient storage for substantial data sets. In yet other cases, a workstation having kernal functionality will interact with separate database systems to perform the mining of such separate databases. This latter arrangement avoids the need to store all needed data sets at the workstation 100, and permits different users at respective workstations (or personal computers) to access the same database for mining purposes. While application of the present invention presented herein may illustrate or suggest the use of one or more of such configurations, it should be understood that inventive method and system solutions in accordance with the present inventive teachings can be embodied in any of the above-mentioned configurations—or combinations of such configurations.

Figure 2:
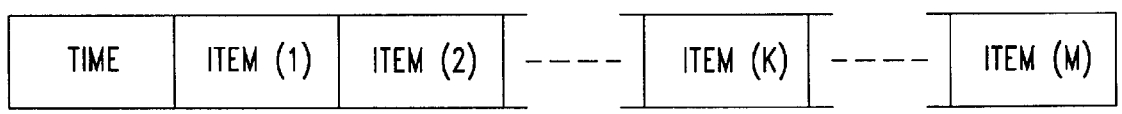
FIG. 2 shows one illustrative format for a transaction data record.

FIG. 2 shows an example of a transaction data record 200 having a timestamp field and a plurality of item fields, ITEM(K), for K=1, . . . , K(MAX). In general, an ITEM(K)

for some K may correspond to any item, e.g., coffee or doughnuts in the above example. Other formats for transaction records may be used, or the format of FIG. 2 may take a particular detailed arrangement for some applications. In Agrawal, et al 93, the authors propose a binary transaction vector with t[k]=1 if customer t bought the item $I_k$, and t[k]=0 otherwise that proves useful in representing transactions. In many cases standard flat files of data transactions will prove appropiate. Transaction records may, of course, include other transaction data, such as customer or seller identification (department, store location, etc.).

Formal Problem Definition

It proves useful to now introduce definitions, notation and contexts to help in understanding the use of illustrative embodiments and applications of the present invention.

Thus, given a set of items and a set of transactions, where each transaction consists of a subset of the set of items, the problem of discovering association rules is defined as finding relationships between the occurrences of items within transactions. An association rule of the form X→Y is a relationship between the two disjoint itemsets X and Y (an itemset is a set of items). An association rule is described in terms of support and confidence.

The support of an itemset X is the fraction of transactions that contain the itemset. An itemset is called large (or, sometimes,frequent), if its supports exceeds a given threshold $\sup_{min}$. Likewise, if support for the set of transactions containing both X and Y, i.e., X∪Y, exceeds a chosen $\sup_{min}$, then X∪Y is large.

The confidence of a rule X→Y is the fraction of transactions containing X that also contain Y. The association rule X→Y holds if X∪Y is large and the confidence of the rule exceeds a given threshold $\text{con}_{min}$.

To deal with cyclic association rules, we enhance the transaction model by a time attribute that describes the time when the transaction was executed. (This time attribute is represented in FIG. 2 by the field labeled TIME.) In this description, we assume that a unit of time is given (e.g., by the user, or by a default mechanism). For simplicity of presentation, other treatments of time, such as multiple units of time and/or a time hierarchy, will not be expressly treated in this description, but those skilled in the art will make adjustments within the spirit of the present teachings to incorporate uses of such altrnative treatments of time. We denote the $i^{th}$ time unit, $i \geq 0$, by $t_i$. That is, $t_i$ corresponds to the time interval [i·t, (i+1)·t), where t is the unit of time. We denote the set of transactions executed in $t_i$ by D[i]. It proves convenient to refer to D[i] specifically as "time segment i" or generically as a "time segment." We define the problem of discovering cyclic association rules as finding cyclic relationships between the presence of items within transactions.

The support of an itemset X in D[i] is the fraction of transactions in D[i] that contain the itemset X. Likewise, support of an itemset X∪Y in D[i] is the fraction of transactions in D[i] that contain the itemset X∪Y. The confidence of a rule X→Y in D[i] is the fraction of transactions in D[i] containing X that also contain Y. An association rule X→Y holds in time unit $t_i$, if the support of X∪Y in D[i] exceeds $\sup_{min}$, and the confidence of X→Y exceeds $\text{con}_{min}$.

A cycle c is a tuple (l, o) consisting of a length l (in multiples of the time unit) and an offset o (the first time unit in which the cycle occurs), $0 \leq o < l$. We say that an association rule has a cycle c=(l, o) if the association rule holds in every $l^{th}$ time unit starting with time unit $t_o$. For example, if the unit of time is an hour and "coffee→doughnuts" holds during the interval 7 AM–8 AM every day (i.e., every 24 hours), then "coffee→doughnuts" has a cycle (24, 7). We denote the minimum and maximum cycle lengths of interest by $l_{min}$ and $l_{max}$, respectively. We refer to an association rule that has a cycle as cyclic. An association rule may have multiple cycles. For example, if the unit of time is an hour and "coffee→doughnuts" holds during the interval 7 AM–8 AM and 4 PM–5 PM every day (i.e., every 24 hours), then "coffee→doughnuts" has two cycles: $c_1$=(24, 7) and $c_2$=(24, 16).

We say that a cycle $(l_i, o_i)$ is a multiple of another cycle $(l_j, o_j)$ if $l_j$ divides $l_i$ and $(o_j = o_i \mod l_j)$ holds. By definition, once a cycle exists, all of its multiples with length less than or equal to $l_{max}$ will exist. Therefore, a primary interest is to discover "large" cycles, where a large cycle is the one that is not a multiple of any other cycle. A time unit $t_i$ is said to be "part of a cycle" c=(l, o) or "participate in a cycle" c if o=i mod l holds.

An association rule can be represented as a binary sequence where the ones correspond to the time units in which the rule holds and the zeros correspond to the time units in which the rule does not have the minimum confidence or support. For instance, if the binary sequence 001100010101 represents the association rule X→Y, then X→Y holds in D[2], D[3], D[7], D[9], and D[11]. In this sequence, (4,3) is a cycle since the corresponding rule holds within every fourth time unit stating from time unit $t_3$. A cycle can also be represented by a binary sequence. For example, cycle (4,3) can also be represented as 0001.

Similar to association rules, itemsets can also be represented as binary sequences where ones correspond to time units in which the corresponding itemset is large and zeros correspond to time units in which the corresponding itemset does not have the minimum support. Also, an itemset is said to be cyclic if the itemset is large at regular intervals (i.e., the sequence representing the itemset is cyclic).

Discovering Cyclic Association Rules

Though useful in many respects, existing algorithms for discovering association rules cannot be applied for discovering cyclic association rules. In order to use existing algorithms for detecting cyclic association rules, one might consider extending the set of items with time attributes, and generate rules. For example, one such rule could be (day=monday)∪X→Y. This approach segments the database such that all transactions that have the same time attribute value are within the same segment. For example, if the time attribute is day, then all the transactions that occurred on Mondays will be within one segment. In this case, the support of the rule (day=monday)∪X→Y is the ratio of the fraction of all transactions that occurred on Mondays and contain X and Y to all transactions. Similarly, the confidence of this rule is the ratio of (i) the fraction of all transactions that occurred on Mondays and contain X and Y to (ii) the fraction of all transactions that occurred on Mondays and contain X. However, there are a number of reasons why such an approach will not solve our problem, as we show below.

First, it is possible that this approach will detect non-existing cycles. For example, this approach may detect that every Monday X→Y holds, although X→Y holds only every second Monday, or only on some Mondays but not on all. This may occur, for example, when the support of (day=monday)∪X∪Y exceeds $\sup_{min}$, but the ratio of the fraction of all transactions that occurred on some Mondays that contain both X and Y to all transactions is below $\sup_{min}$. That is, the ratio of the fraction of all transactions that occurred on the remaining Mondays that contain both X and Y to all transactions is high enough to compensate for the other Mondays. In this case, this approach assumes that the support for (day=monday)∪X∪Y exceeds the minimum support threshold, although, in fact, the support of only (day=only-some-mondays)∪X∪Y is above the minimum threshold. Therefore, a non-existing cycle every Monday can be mistakenly identified. Another problem with this approach is that it cannot detect cycles of abitrary lengths. For example, it cannot detect an association rule that holds every 10 days.

One may also consider the following approach to apply the existing algorithms for detecting cyclic association rules. Each transaction in a time unit $t_i$ is extended with all possible cycles in which time unit $t_i$ can participate (there are $l_{max}$ such cycles, where $l_{max}$ is the maximum cycle length of interest). Such an approach will generate rules in the form of (cycle=(l, o))∪X→Y. Thus, each possible cycle c=(l, o) defines a segment that consists of all the transactions that occurred in each time unit $t_i$ for which (o=i mod l) holds. In this case, the support of the rule (cycle=(l, o))∪X→Y is the ratio of the fraction of all transactions that occurred within all the time units $t_i$ for which (o=i mod l) holds and that contain both X and Y to all transactions. Similarly, the confidence of this rule is the ratio of the fraction of all transactions that occurred within all the time units $t_i$ for which (o=i mod l) holds that contain both X and Y to the fraction of all transactions occurred within all the time units $t_i$ for which (o=i mod l) holds that contain X.

Again, this approach may mistakenly detect non-existing cycles. For example, this approach may detect that (cycle=(l, o))∪X→Y holds (i.e., X→Y has a cycle c), although X→Y holds only within some time units $t_i$'s for which (o=i mod l) holds, but not within all.

A Sequential Algorithm

Discovering cyclic association rules in accordance with one illustrative technique involves generating rules in each time unit and then applying a pattern matching algorithm a described below to discover cycles. We refer to this approach as the sequential algorithm. Useful rule-generating techniques to be applied in time units include some based on Agrawal, R., and R. Srikant, "Fast Algorithms for Mining Association Rules," *Proc. $20^{th}$ Intl.l Conf VLDB*, Santiago, Chile, 1994 (hereinafter "Agrawal, et al 94"), and on descriptions in Savasere, A, E. Omiecinski, and S. Navathe. "An Efficient Algorithm for Mining Association Rules in Large Databases," *Proc. of the 21st Intl.l Conf. on Very Large Data Bases*, pages 432–444, Zurich, Switzerland, September 1995. In particular, the Agrawal, et al 94 paper presents the so-called Apriori algorithm. These papers and the above-cited Agrawal, et al 93 papers are hereby incorporated by reference as if set out in their entirety in this description.

Existing algorithms (such as the Apriori algorithm) typically discover the association rules in two steps. In the first step, large itemsets are generated, and in the second step association rules are generated from the large itemsets. The running time for generating large itemsets can be substantial, since calculating the supports of itemsets and detecting all the large itemsets for each time unit grows exponentially in the size of the large itemsets. To reduce the search space for the large itemsets, the existing algorithms exploit the following property: "Any superset of a small itemset must also be small." (Recall the definitions of "large" (frequent) itemsets given above; a "small" itemset is one that is not large.)

Existing algorithms typically calculate support for itemsets iteratively and prune all the supersets of a small itemset during the consecutive iterations. Let us refer to this pruning technique as support-pruning. In general, these algorithms execute a variant of the following steps in the $k^{th}$ iteration:

1. The set of candidate k-itemsets is generated by extending the large (k−1)-itemsets discovered in the previous iteration (support-pruning).
2. Supports for the candidate k-itemsets are determined by scanning the database.
3. The candidate k-itemsets that do not have minimum support are discarded and the remaining ones constitute the large k-itemsets.

The idea is to discard most of the small k-itemsets during the support-pruning step so that the database is searched only for a small set of candidates for large k-itemsets.

In the second step, the rules that exceed the confidence threshold $con_{min}$ are constructed from the large itemsets generated in the first step with one of the existing algorithms. In an illustrative embodiment of our sequential algorithm, we apply the Apriori and the ap-genrules algorithms from Agrawal, et al 94 to each time unit. Once the rules of all the time units have been discovered, cycles are detected. If r is the number of rules detected, the complexity of the cycle detection phase has an upper bound of $O(r \cdot n \cdot l_{max})$ where n is the number of time units and $l_{max}$ is the maximum cycle length of interest (see below in the section Cycle Detection).

In practice, if all the rules in each time unit fit into main memory of a single computer, then the running time of the cycle detection phase has typically been found to be feasible. However, if the rules in all the time units do not fit into main memory, then the overhead of I/O operations substantially increases the running time of the cycle detection phase (see below), and therefore the sequential algorithm may be less desirable in some applications for detecting cyclic association rules.

Figure 3:
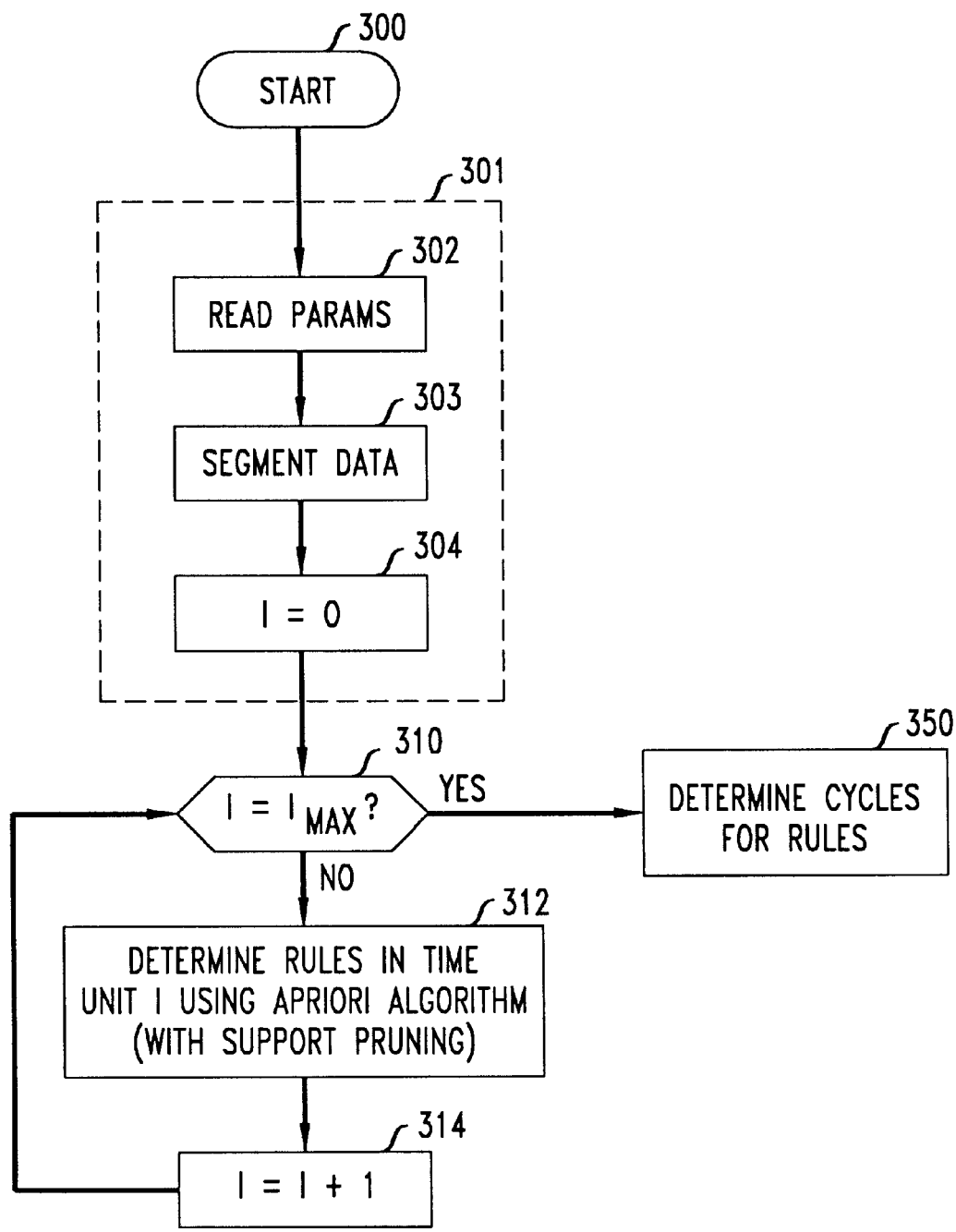
FIG. 3 shows an illustrative embodiment of a sequential method (algorithm) in accordance with one aspect of the present invention.

FIG. 3 shows a flowchart for an illustrative method using a sequential algorithm in accordance with one aspect of the present invention. This and other methods described herein may be practiced in a computer or network of computers as noted above. In FIG. 3, after starting at element 300, the process is shown entering an initialization block 301 during which typical user-specified (or default) process parameters are read and stored in computer memory. In some cases, the user may specify more or fewer parameters, as will befit the nature of the mining to be undertaken and the programming language or toolkit used to effect the user requirements. The database containing the transaction records to be mined is then logically segmented (step 303) to reflect the time units selected by the user. In appropriate cases, the database may be physically segmented between different memories or even different computers. To further initialize the mining process, the item parameter i is illustratively set to zero (step 304) for the presently described process representation.

After completing initialization steps 301, processing is accomplished in accordance with the loop of steps 310, 312 and 314. Specifically, a test is made at step 310 for the current value of i; if $i<i_{max}$, then step 312 is performed and i is incremented at step 314. Processing at step 312 involves determination of rules in time unit i (e.g., using the well-known a priori algorithm, but with the additional application of support pruning as described above. A typical output of 312 is a binary sequence of the type described above, where at the ith bit position in the sequence a 1 indicates that the currently considered rule meets specified support and confidence thresholds. A 0 in the ith bit position in such sequences indicates that the support and confidence (for a particular rule) for the ith time segment does meet the support and confidence thresholds. When the test at step 312 for i=$i_{max}$ yields a positive (yes) response, then processing is passed to block 350 for determination of cycles for the rules determined at step 312.

Figure 4:
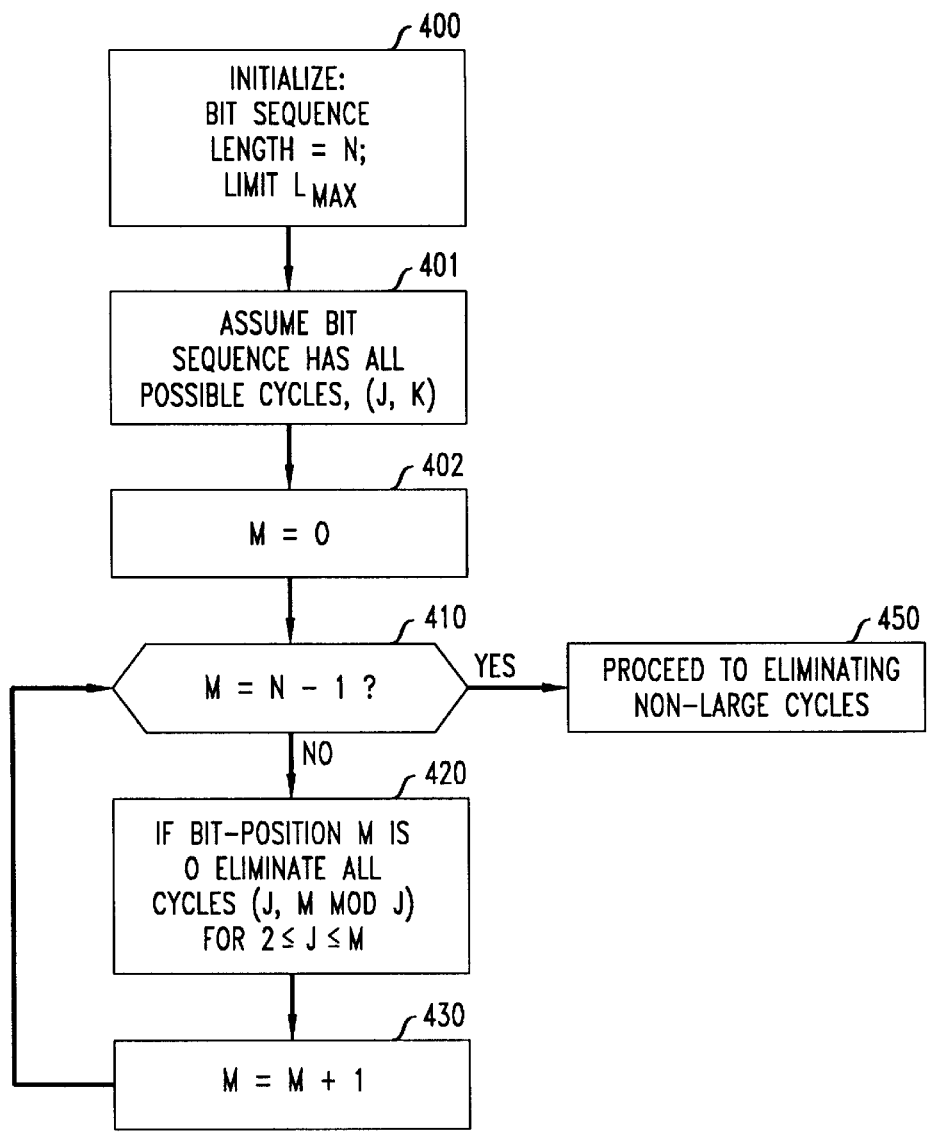
FIG. 4 is a flowchart of an illustrative method for determining cycles for detected association rules.

FIG. 4 elaborates the cycle determination step 350 in FIG. 3. In FIG. 4, block 400 represents the bit sequence length initialization for sequences derived in the processing of FIG. 3. Initially, it proves convenient (as shown by block 401) to assume that the sequences have all possible cycles (j, k). As will become apparent, cycles will then be selectively eliminated to yield the final result. To effect this elimination, the bit position index m is initially set to 0 at step 402 and the loop 410, 420 and 430 is performed until a yes result is obtained upon performing the test for m=n−1 at step 410. For each pass through this loop, bit position m is tested for a 0 value. When this 0 value is determined at step 410 all cycles (j, m mod j) are eliminated for 2 □ j □ m. Processing of the remaining (j, k) cycles then proceeds to block 450 for the elimination of non-large cyles.

Figure 5:
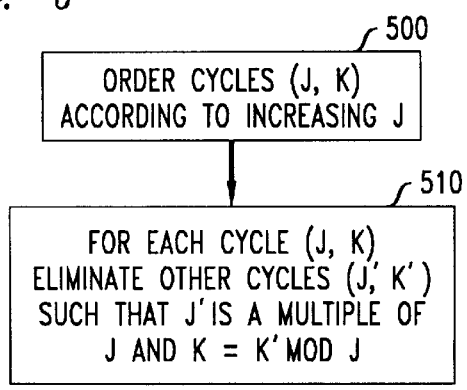
FIG. 5 shows steps illustratively performed in eliminating non-large cycles.

The steps illustratively employed for the elimination of non-large cycles is shown in FIG. 5. Specifically, it proves convenient to order the cycles (j,k) in order of increasing j, as reflected by block 500 in FIG. 5. Then, as reflected by block 510 in FIG. 5, all cycles (j', k') for which j' is a multiple of j and k=k' mod j are eliminated. The resulting cycles then reflect the cyclic characteristics of the original data.

Cycle Pruning Cycle Skipping and Cycle Elimination

A major portion of the running time of the sequential algorithm is typically spent in calculating support for itemsets. We now present three techniques—cycle pruning, cycle skipping, and cycle elimination to prune the number of itemsets for which the support must be calculated. These techniques rely on the following observation: "A cycle of the rule X→Y is a multiple of a cycle of itemset X∪Y." Eliminating cycles as early as possible therefore substantially reduces the running time of cyclic association rule detection. Each of these techniques will now be discussed in turn.

Cycle skipping is a technique for avoiding counting the support of an itemset in time units which cannot be part of a cycle of the itemset. Cycle-skipping is based on the observation: "If time unit $t_i$ is not part of a cycle of an itemset X, then there is no need to calculate the support for X in time segment D[i]." However, cycle skipping is useful only if we have information about the cycles of an itemset X. But the cycles of an itemset X can be computed exactly only after we compute the support of X in all the time segments.

In order to avoid this self-dependency, it proves useful to approximate the cycles of itemsets. To do this, we use a technique we call cycle pruning. It is based on the property: "If an itemset X has a cycle (l, o), then any of the subsets of X has the cycle (l, o)." (Thus, e.g., for the itemset coffee∪doughnuts to have a cycle (l, o), itemset coffee must have the cycle (l, o).) This property implies that any cycle of itemset X must be a multiple of a cycle of an itemset that is a subset of X. This also implies that the number of cycles of an itemset X is less than or equal to the number of cycles of any of X's subset.

Therefore, one can arrive at an upper bound on the cycles that an itemset X can have by looking at all the cycles of the subsets of X. By doing so, we can reduce the number of potential cycles of itemset X, which, in turn (due to cycle-skipping), reduces the number of time units in which we need to calculate support for X. Thus, cycle-pruning is a technique for computing the candidate cycles of an itemset by merging the cycles of the itemset's subsets.

However, it is possible in some cases that we cannot compute the candidate cycles of an itemset, e.g., when dealing with singleton itemsets. In these cases, it proves convenient to assume that an itemset X has every possible cycle and therefore, calculate the support for X in each time segment D[i] (except the time units eliminated via support-pruning). This method is used in an illustrative embodiment of the sequential algorithm.

EXAMPLE 1

If we know that 010 is the only large cycle of item A, and 010 is also the only large cycle of item B, then cycle pruning implies that the itemset consisting of items A and B can have only the cycle 010 or its multiples. Cycle skipping indicates that we do not need to calculate the support for A∪B in every time segment but only in every third one starting with D[1].

EXAMPLE 2

If we know that 010 is the only large cycle of item A and 001 is the only large cycle of item B, then cycle-pruning implies that the itemset A∪B cannot have any cycles. Cycle skipping indicates that we do not need to calculate the support for A∪B in any of the time segments.

We now introduce one more optimization technique we call cycle elimination that can be used to further reduce the number of potential cycles of an itemset X. Cycle elimination is used to eliminate certain cycles from further consideration once we have determined they cannot exist. Cycle elimination relies on the property: "If the support for an itemset X is below the minimum support threshold $\sup_{min}$ in time segment D[i], then X cannot have any of the cycles (j, i mod j), $l_{min} \leq j \leq l_{max}$." Cycle-elimination enables us to discard cycles that an itemset X cannot have as soon as possible—as demonstrated in the following example.

EXAMPLE 3

If the maximum cycle length of interest is $l_{max}$ and the support for itemset A is below the threshold $\sup_{min}$ in the first $l_{max}$ time units, then cycle-elimination implies that A cannot have any cycles. Cycle-skipping indicates that there is no need to calculate the support for A in time units greater than $l_{max}$.

Interleaved Algorithm

We now present an alternative algorithm, which we refer to as the interleaved algorithm, for discovering cyclic association rules. The interleaved algorithm consists of two phases. In the first phase, the cyclic large itemsets are discovered. In the second phase, cyclic association rules are generated.

In the first phase, the search space for the large itemsets is reduced using cycle-pruning, cycle-skipping and cycle-elimination as follows. (For k=1, all possible cycles are initially assumed to exist for each single itemset.) For each k, k>1:

1. Cycle-pruning is applied to generate the potential cycles for k-itemsets using the cycles for (k−1)-itemsets.
2. Time segments are processed sequentially. For each time unit $t_i$:
   2.1 Cycle-skipping determines, from the set of candidate cycles for k-itemsets, the set of k-itemsets for which support will be calculated in time segment D[i].
   2.2 If a k-itemset X chosen in Step 2.1 does not have the minimum support in time segment D[i], then cycle-elimination is used to discard each cycle c=(l, o), for which (o=i mod l) holds, from the set of potential cycles of X.

This process terminates When the list of potential cycles for each k-itemset is empty. Cycle-pruning, cycle-skipping and cycle-elimination can reduce the candidate k-itemsets for which support will be counted in the database substantially, and therefore can reduce the running time of calculating the large itemsets. This is demonstrated by the following example.

EXAMPLE 4

Suppose that the length of the longest cycle we are interested in is $l_{max}$=6 and 1110000000111111111 and 1111010111111111111 represent items A and B, respectively. If the sequential algorithm is used, then the support for A and B will be calculated in all the time segments and the support for A∪B will be calculated in time segments 0–2, 10–19 (due to support-pruning). If the interleaved algorithm is used, then the support for A will be calculated in time segments 0–9 (due to cycle-elimination and cycle-skipping), whereas the support for B will be calculated in all the time segments, and since A has no cycles, A∪B cannot have any cycle (due to cycle-pruning), and the support for A∪B will not be calculated in any of the time units (due to cycle-skipping).

In the second phase of the interleaved algorithm, the cyclic association rules can be calculated using the cycles and the support of the itemsets found in the first phase without additional scanning of the database. Interleaving cycle detection with large itemset detection also reduces the overhead of rule generation phase. This is because a cycle of the rule X∪Y must be a multiple of a cycle of itemset X∪Y, and at the end of the first phase of the interleaved algorithm we already know the cycles of large itemsets. Thus, the set of candidate cycles for a rule X→Y initially consists of the set of cycles of the itemset X∪Y. As a result, we need to calculate the confidence of a rule X→Y only for time units that are part of cycles of X∪Y. Moreover, whenever we encounter a time unit $t_i$ in which this rule does not have minimum confidence $con_{min}$, we can eliminate each other candidate cycle of this rule for which (j, i mod j), 1≦j≦m holds. Once the cycles of the association rules are detected, the cycles that are not large can be eliminated (see Cycle Detection, below).

Figure 6:
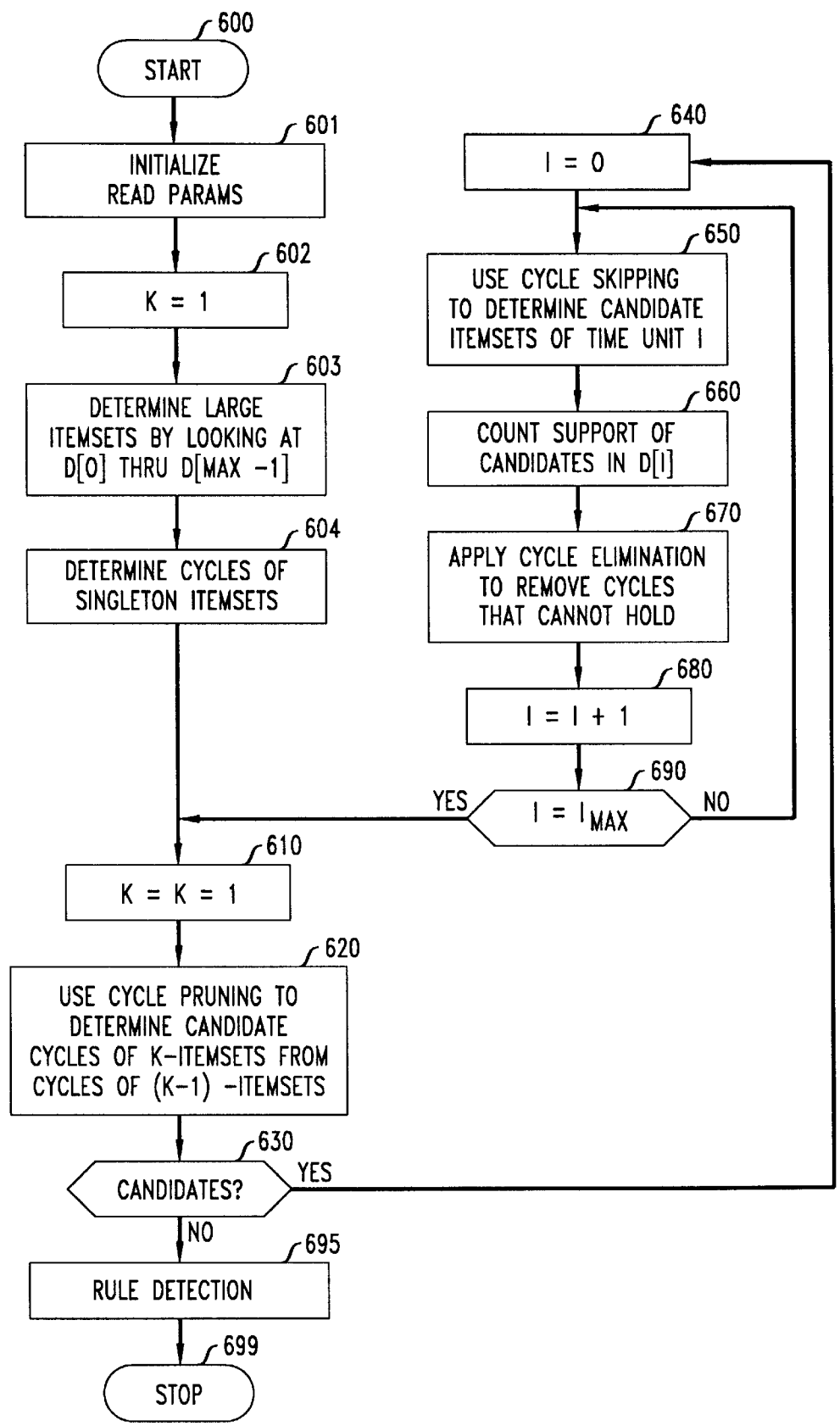
FIG. 6 shows an interleaved algorithm in accordance with an illustrative alternative embodiment of the present invention.

FIG. 6 shows a flowchart for an illustrative method using an interleaved algorithm in accordance with the above teachings. As was the case for the method illustrated by the flowchart of FIG. 3, the present illustrative interleaved method may be practiced using a variety of computers or networks of computers.

The process of FIG. 6, after starting at element 600, uses an initialization block, illustratively of the same general type used in the flowchart of FIG. 3. Thus step 601 represents the initialization and reading of parameters as for the sequential processing of FIG. 3. The index k is initialized at k=1 at step 602 and step 603 determines the large itemsets for the k=1 (singleton) case by examining D[0] through D[max-1]. Step 604 corresponds to the determination of cycles for the singleton itemset case.

At step 610 the k variable is incremented and the general cycle-pruning techniques are applied at step 620 to determine candidate k-itemset cycles from (k-1)-itemset cycles. If no candidates are found then the rule detection process is applied at step 695 and the process is concluded. If, however, the test at step 630 reflects the presence of k-itemset candidates for the current value of k, then the steps 640, 650, 660, 670, 680 and 690 are performed to effect cycle skipping and cycle elimination until all values for i have been used. k is then incremented until the maximum value for k is reached, at which point rule detection is performed at step 695.

I/O Considerations

Although the interleaved algorithm reduces the CPU overhead of calculating support for itemsets substantially, it incurs a higher overhead for I/O operations when compared to the sequential algorithm. To reduce such consequences, in accordance with other embodiments of the present invention, each time a time segment D[i] is accessed, calculation of cycles and support for k, (k+1), . . . , and (k+g)-itemsets, for some g>1, is advantageously combined. In this case, cycle-pruning for each (k+j)-itemset, 0≦j≦g, is done by merging the cycles of (k-1) subsets of the (k+j)-itemset. That is, the set of candidate cycles of a (k+j)-itemset consists of the intersection of the sets of cycles of all (k-1) subsets of the itemset. While scanning a time segment D[i], first supports for the k-itemsets that have candidate cycles into which time unit $t_i$ participates are calculated. If the support for a candidate k-itemset X is below $sup_{min}$, then cycle-elimination is applied not only to the candidate cycles of itemset X, but also to each (k+j)-itemset, 0≦j≦g, that is a superset of X. Note that cycle elimination eliminates potentially more (k+j)-itemsets compared to support-pruning. This is because support-pruning eliminates (k+j)-itemsets that are supersets of X only in D[i] whereas cycle-elimination eliminates (k+j)-itemsets that are supersets of X not only in D[i] but potentially also in other time segments following D[i]. Once supports for the candidate k-itemsets in D[i] are calculated, then supports for the candidate (k+1)-itemsets in D[i] are calculated similarly, followed by supports for the candidate (k+2)-itemsets in D[i], and so on. Those skilled in the art will select preferred values for g, depending, e.g., on system configuration and the nature of the data records.

Cycle Detection

Given a binary sequence of length n and the maximum cycle length of interest $l_{max}$, the running time of detecting all cycles with lengths less than or equal to $l_{max}$ of the binary sequence has an upper bound of $O(l_{max} \cdot n)$ operations. We now present a two-step approach to detecting cycles. Initially, the set of candidate cycles contains all possible cycles. In the first step, the sequence is scanned, and each time a zero is encountered at a sequence position i, candidate cycles (j, i mod j), 1≦j≦m are eliminated from the set of candidate cycles. The first step completes whenever the last bit of the sequence is scanned or the set of candidate cycles becomes empty, which ever is first. In the second step, large cycles (i.e., cycles that are not multiples of any existing cycles are detected). A straight-forward approach to eliminating cycles that are not large is: starting from the shortest cycle, for each cycle $c_i=(l_i, o_i)$, eliminate each other cycle $c_j=(l_j, o_j)$ from the set of cycles, if $l_j$ is a multiple of $l_i$ and ($o_i$=$o_j$ mod $l_i$) holds. The illustrative sequential algorithm typically uses this approach to detect the cycles.

However, if we know initially, or at any time during scanning the sequence that some of the cycles cannot exist in the sequence (e.g. due to cycle-pruning or cycle-elimination), the cycle detection procedure can be optimized by skipping sequence positions that cannot be part of any of the candidate cycles. That is, instead of scanning the sequence sequentially, we can skip the bit positions that are not part of the candidate cycles (i.e., cycle-skipping). For example, if $l_{max}$ is three, and we know initially that 01, 010 and 001 cannot be cycles of a given sequence (e.g., due to cycle-pruning), then we need not scan bit positions 1, 5, 7, 11, etc. Also, while scanning the sequence, if we also eliminate candidate cycle 100 (i.e., cycle-elimination), we can skip scanning every second bit of the sequence starting at that point. The interleaved algorithm advantageously employs these optimization techniques (cycle-pruning, cycle-elimination and cycle-skipping) to reduce the overhead of cycle detection and, importantly, the overhead of calculating support for itemsets, since the interleaved algorithm "interleaves" both cycle detection and support calculation for itemsets.

The cycle detection process can be further optimized by considering a candidate cycle $c_i = (l_i, o_i)$ only when there is no other candidate cycle $c_j = (l_j, o_j)$ remaining such that $c_i$ is a multiple of $c_j$ (i.e., $l_j$ divides $l_i$ and $o_j = o_i \mod l_j$). Other optimizations of cycle detection based on the present teachings will occur to those skilled in the art.

Additional Implementation Details

In this section, we present illustrative implementation components and methods for discovering cyclic association rules in embodiments of the present invention. Though many particular algorithms and their variants may be used as a basic data mining algorithm, it proves convenient in embodiments of the present invention to use the apriori algorithm from Agrawal, et al 94 for this purpose. The sequential algorithm is based directly on apriori, with optimizations to speed up the counting of support of itemsets of size 2. Thus, we use to advantage an array for this instead of a hash-tree when memory permits. We found the array to be a much faster technique for discovering 2-itemsets.

The interleaved algorithm uses a well-known hash-tree technique as described in Agrawal, et al 94, to store the large itemsets, their patterns and support counts. The interleaved algorithm also advantageously uses a temporary hash-tree during the processing of an individual time segment. Candidate generation (generation of itemsets of size k+1 and their candidate cycles from itemsets of size k) is employes cycle pruning. Appendix 1 presents the first phase of the interleaved algorithm (cyclic large itemset detection) in psuedo-code. After that, it proves advantageous to apply a generalization of the rule generation procedure in Agrawal, et al 94 for cyclic association rule generation.

Memory Management

As noted above the sequential algorithm advantageously runs the apriori algorithm on each time segment. In order to determine the cycles of the association rules, we need to determine the binary sequence corresponding to each association rule. If there is space in memory to hold a binary sequence for each association rule, we can store the rules and their binary sequences in a hash tree. After generating all the rules over all the time segments, we run cycle detection algorithms.

However, if there is not enough memory to store the rules and their binary sequences, the rules are advantageously written to disk as generated in each time unit. When all association rules for all the time segments are found, the binary sequences for each individual association rule are constructed. In order to do this, we merge the rules from the different time segments. Once this merging is done, we can run the cycle detection algorithms.

Finally, if we do not have enough memory to store all the data structures needed by the apriori algorithm, we have to use one of the overflow management techniques suggested in Agrawal, et al.

Like the apriori algorithm, the interleaved algorithm has two distinct phases. In the first phase, all large itemsets with cycles have their supports counted in the appropriate time segments. In the second phase, rules are generated using the cycle and support information of the large itemsets.

For the first phase, the interleaved algorithm proceeds "level-by-level" to determine itemset support. It first determines the itemset support for singleton candidate itemsets, generates cycles for them, then generates itemsets of size 2 and their potential cycles, etc. In this phase, the interleaved algorithm requires enough memory to hold all large itemsets of a particular size and their support counts in memory. (In addition, it advantageously stores the new candidates and their "potential" cycles. The size of the latter is usually much smaller.) If there is not enough memory, the support counts are typically broken up into chunks and written to disk. After processing of all the time segments, the support counts are merged in memory.

For the cyclic rule generation phase, if there is space in memory to hold all the large itemsets and their support counts for all the time units, rule generation can run entirely in memory. However, if there is a shortage of memory and space is available to hold only a single level of large itemsets and their support counts, we can generate rules in a level-by-level fashion as well starting at the level of the largest itemset. For doing this, we can use a modification of the ap-genrules procedure in Agrawal, et al that we call Level_GenRuleCycles as shown in Appendix 2. Level_GenRuleCycles is a set oriented rule generation procedure that creates rules such that all rules needing to look at the support counts of k-itemsets are generated during one iteration of the outer while loop. (Note that this procedure can be profitably used, instead of ap-genrules, for generating association rules when memory is limited.)

For example, suppose we have the large itemset ABCD with a cycle 001. Initially, ruleList is the empty set and in the first iteration gets set to {ABCD, sup-array$_{ABCD}$, {001}, {}}. In the next round, ABC→D, ABD→C, ACD→B and BCD→A are generated and tested. This round keeps the support counts of all 3-itemsets in memory. Suppose only ABC→D and ABD→C have cycles. ruleList becomes {{ABCD, sup-array$_{ABCD}$, {001}, {ABC→D, ABD→C}}}. (Of course, large itemsets ABC and ABD will get added to prev, but we ignore that here to keep the example small.) In the next round, only the rule AB→CD is generated. This round keeps the support counts of all the 2-itemsets in memory. If AB→CD has a cycle, ruleList is transformed to {{ABCD, sup-array$_{ABCD}$, {001}, {AB→CD}}} and vanishes in the next round.

This algorithm requires only one member of ruleList to be in memory at any time. If the support counts of a particular level do not fit into memory as well, one has to sort ruleList according to the candidate rules that it stores and merge the itemset support counts in order to generate cyclic association rules.

In typical applications, the interleaved algorithm performs at least as well, and often times, significantly better than the sequential algorithm. Thus, for example, in illustrative examples relative performance enhancements for the interleaved algorithm range from 5%, when support is very high, to several hundred percent, when large itemset sizes are over 5. Much of this advantage comes from the decreased I/O costs possible with the interleaved algorithm. Further, the interleaved algorithm is found to readily scale to accommodate large databases.

While the term "transaction" has been used in connection with particular types of transactions, such as supermarket or other retail transactions, it should be understood that the present invention covers processing of transactions of any kind. Likewise, though transaction item values have been illustratively indicated as occurring in a single record or file, particular implementations will store transaction data in varying ways, including storing such data in a plurality of files.

APPENDIX 1

Interleaved Algorithm for Cyclic Large Itemset Detection

/* This algorithm uses two hash-trees. itemset-hash-tree contains candidates of size k, their potential cycles, and space to store support counts for the relevant time units. An "active" itemset at time unit t is an itemset that has a cycle that t participates in. tmp-hash-tree, during the processing of time segment t, contains all the itemsets that are active in t. */

```
initially, -itemset-hash-tree contains singleton itemsets
    and all possible cycles
k=1
while (there are still candidates in itemset-hash-tree with
    potential cycles)
    for t=0 to n-1
        insert active itemsets from itemset-hash-tree into
            tmp-hash-tree // cycle
        skipping measure support in current time segment
            for each itemset in
        tmp-hash-tree
        forall l ∈ tmp-hash-tree
            if (sup_l<sup_min)
                then delete corresponding cycles of itemset l //
                    cycle elimination
                else insert (l, sup_l, t) into itemset-hash-tree
                    // this just inserts a (sup_l, time) entry in one of
                    itemset l's fields
        end forall
        empty tmp-hash-tree
    endfor
    verify actual cycles of each member of itemset-hash-
        tree
    generate new candidates of size k+1 using cycle prun-
        ing
    k=k+1
    empty itemset-hash-tree after copying it to disk
    insert new candidates into itemset-hash-tree
endwhile
```

APPENDIX 2

Procedure Used for Cyclic Rule Generation

```
Procedure Level_GenRuleCycles()
level=size of the largest itemset
/* ruleList is a list of records that have four fields. The
    first three fields contain an itemset name, the support
    array for the itemset, and the list of cycles for the
    itemset.
The fourth field is a list of candidate rules generated from
    the itemset that are known to have cycles. */
ruleList={} // "ruleList" is the current list of quintuplets
    used for generating rules.
while (level≧1)
    read in support counts and cycles of large itemsets of
        size level
    newRuleList={}
    forall lItem ∈ ruleList do
        if (lItem's itemset is being used to generate rules for
            the first time)
            then generate singleton rules
            else generate candidate rules using apriori-gen on
                lItem's current rules verify cycles for each rule
                generated and discard rules without cycles.
        lItemNew=lItem with old rules replaced by the new
            rules
        newRuleList=newRuleList+lItemNew
    endforall
    ruleList=newRuleList+quintuplets created from large
        itemsets at current level
    level--
endwhile
```

What is claimed is:

1. A database mining system for extracting cyclic association rules for disjoint itemsets occurring in a set of transaction records, said transaction records indicating items included in respective transactions and a transaction time for each transaction, D[i] being the set of transactions occurring in an ith ordered time segment, the system comprising means for determining support for itemsets in each D[i], means for determining association rules that satisfy predetermined support and confidence thresholds in each D[i], and means for identifying cycles in said association rules satisfying said predetermined support and confidence thresholds.

2. The system of claim 1 wherein said means for determining support comprises means for iteratively determining support for k-itemsets based on (k−1)-itemsets.

3. The system of claim 1 wherein said means for determining association rules in each D[i] comprises means for performing an a priori algorithm.

4. The system of claim 3 wherein said means for determining association rules in each D[i] further comprises means for performing support pruning.

5. The system of claim 1 wherein said predetermined support and confidence thresholds are user-specified and said system further comprises means for receiving said user-specified thresholds.

6. A database mining system for extracting cyclic association rules for disjoint itemsets occurring in a set of transaction records, said transaction records indicating items included in respective transactions and a transaction time for each transaction, D[i] being the set of transactions occurring in an ith ordered time segment, the system comprising means for determining support for itemsets in each D[i], means for determining association rules that satisfy predetermined support and confidence thresholds in each D[i], and means for identifying cycles in said association rules satisfying said predetermined support and confidence thresholds, wherein the output of said means for determining association rules comprises an ordered binary sequence in which a 1 in bit position M reflects the existence of a particular rule in a time interval corresponding to bit position M, and a 0 in bit position M indicates the absence of such particular rule, and wherein said means for identifying cycles comprises means for identifying said binary sequence as having all cycles (j, j) for M=0, means for iteratively testing for a 0 in bit position M for M=1, 2, . . . , N−1, and means for eliminating at the Mth iteration all cycles (j, M mod j) for $2 \leq J \leq M$ when a 0 is found at bit position M.

7. The system of claim 6 wherein said means for identifying cycles further comprises means for eliminating non-large cycles remaining after cycles have been eliminated by said means for eliminating at the Mth iteration.

8. The system of claim 7 wherein said means for eliminating non-large cycles comprises means for ordering remaining cycles (j, k) in order of increasing j, and means for sequentially eliminating, for each said remaining cycle (j, k), other cycles (j',k') for which j' is a multiple of j and k=k' mod j.

9. A database mining method for extracting cyclic association rules for disjoint itemsets occurring in a set of transaction records, said transaction records indicating items included in respective transactions and a transaction time for each transaction, D[i] being the set of transactions occurring in an ith ordered time segment, the method comprising determining support for itemsets in each D[i], determining association rules that satisfy predetermined support and confidence thresholds in each D[i], and identifying cycles in said association rules satisfying said predetermined support and confidence thresholds.

10. The method of claim 9 wherein said determining support comprises iteratively determining support for k-itemsets based on (k−1)-itemsets.

11. The method of claim 9 wherein said determining association rules in each D[i] comprises performing an a priori algorithm.

12. The method of claim 11 wherein said determining association rules in each D[i] further comprises performing support pruning.

13. The method of claim 9 wherein said predetermined support and confidence thresholds are user-specified and said method further comprises receiving said user-specified thresholds.

14. A database mining method for extracting cyclic association rules for disjoint itemsets occurring in a set of transaction records, said transaction records indicating items included in respective transactions and a transaction time for each transaction, D[i] being the set of transactions occurring in an ith ordered time segment, the method comprising determining support for itemsets in each D[i], determining association rules that satisfy predetermined support and confidence thresholds in each D[i], and identifying cycles in said association rules satisfying said predetermined support and confidence thresholds, wherein the output of said step of determining association rules comprises an ordered binary sequence in which a 1 in bit position M reflects the existence of a particular rule in a time interval corresponding to bit position M, and a 0 in bit position M indicates the absence of such particular rule, and wherein said identifying cycles comprises identifying said binary sequence as having all cycles (j, j) for M=0, iteratively testing for a 0 in bit position M for M=1, 2, . . . , N−1, and eliminating at the Mth iteration all cycles (j, M mod j) for $2 \leq J \leq M$ when a 0 is found at bit position M.

15. The method of claim 14 wherein said identifying cycles further comprises eliminating non-large cycles remaining after cycles have been eliminated by said eliminating at the Mth iteration.

16. The method of claim 15 wherein said eliminating non-large cycles comprises ordering remaining cycles (j, k) in order of increasing j, and sequentially eliminating, for each said remaining cycle (j, k), other cycles (j',k') for which j' is a multiple of j and k=k' mod j.

17. A database mining system for extracting cyclic association rules for disjoint itemsets occurring in a set of transaction records, said transaction records indicating items included in respective transactions and a transaction time for each transaction, D[i] being the set of transactions occurring in an ith ordered time segment, with k an integer index of the size of itemsets, the system comprising means for determining large singleton (k=1)-itemsets in each D[i], and means for determining cycles of said large singleton itemsets;

for each k, $2 \leq k$ means for applying cycle pruning to determine candidate cycles of k-itemsets from cycles of (k−1)-itemsets until said cycle pruning fails to yield new candidates, and means for applying rule detection to candidate cycles determined when said cycle pruning step fails to yield new candidates.

18. The system of claim 17 further comprising means for applying cycle skipping to determine candidate itemsets for each time interval i, $0 \square i \square i_{max}$.

19. The system of claim 18 further comprising means for determining support for candidate itemsets resulting from said cycle-skipping step in each D[i], and means for applying cycle elimination based on said support determined for candidate itemsets.

20. A database mining method for extracting cyclic association rules for disjoint itemsets occurring in a set of transaction records, said transaction records indicating items included in respective transactions and a transaction time for each transaction, D[i] being the set of transactions occurring in an ith ordered time segment, with k all integer index of the size of itemsets, the method comprising for k=1, determining large singleton itemsets in each D[i], and determining cycles of singleton itemsets;

for each k $2 \leq k$ applying cycle pruning to determine candidate cycles of k-itemsets from cycles of (k−1)-itemsets until said cycle pruning fails to yield new candidates, and applying rule detection to candidate cycles determined when said cycle pruning step fails to yield new candidates.

21. The method of claim 20 further comprising the step of applying cycle skipping to determine candidate itemsets for each time interval i, $0 \square i \square i_{max}$.

22. The method of claim 21 further comprising the steps of determining support for candidate itemsets resulting from said cycle-skipping step in each D[i], and applying cycle elimination based on said support determined for candidate itemsets.

* * * * *